United States Patent [19]

Biche et al.

[11] 4,402,623

[45] Sep. 6, 1983

[54] APPARATUS FOR DYNAMICALLY ADJUSTING PAPER TENSION IN A LINEAR MANNER

[75] Inventors: Michael R. Biche, Sunnyvale; Gideon W. Baxter, Hayward, both of Calif.

[73] Assignee: Qume Corporation, San Jose, Calif.

[21] Appl. No.: 330,178

[22] Filed: Dec. 14, 1981

[51] Int. Cl.$^3$ .......................... B41J 11/30; G03B 1/30

[52] U.S. Cl. .................................. 400/618; 400/616.1; 226/74

[58] Field of Search ...................... 400/618, 616, 616.1, 400/616.2; 226/74, 75

[56] References Cited

U.S. PATENT DOCUMENTS

| | | | |
|---|---|---|---|
| 2,302,704 | 11/1942 | Mabon | 400/616 X |
| 2,400,226 | 5/1946 | Euth | 400/616 X |
| 2,557,592 | 6/1951 | Berger | 400/169 X |

*Primary Examiner*—Edgar S. Burr
*Assistant Examiner*—David A. Wiecking
*Attorney, Agent, or Firm*—T. E. Kristofferson; J. M. May

[57] ABSTRACT

Apparatus used in conjunction with printer document feed mechanisms for allowing the dynamic adjustment of the feed mechanisms while paper feed is occurring, thus adjusting paper tension. The apparatus has a linear adjustment capability over its total range. In particular, adjusting levers are attached to the feed mechanism support shaft, pinions being attached to each end of the shaft. The pinion teeth mesh with the teeth of racks attached to each side plate of the feed mechanism. As the adjusting levers are moved, the support shaft and pinions rotate. The rotation of the pinion meshing with the rack causes the support shaft (and feed mechanism) to move, changing the distance between the feed mechanism and the printer platen. This distance, and paper tension, vary linearly with the angular position of the levers. The paper tension can be adjusted while the feed mechanism is operative.

1 Claim, 4 Drawing Figures

APPARATUS FOR DYNAMICALLY ADJUSTING PAPER TENSION IN A LINEAR MANNER

BACKGROUND OF THE INVENTION

Feeding of certain driven members, particularly computer forms, requires a feed mechanism capable of moving at extremely high speeds and of undergoing rapid acceleration and deceleration. Any skew or meandering of the drive causes misalignment of the forms or members with operating devices, such as printer heads. If the feed mechanism is not fast acting, misregistration can readily occur. In the case of perforated documents which are fed through pin drive elements, skewing and improper entrance and stripping of the pin tends to tear the document, jam the document in the mechanism and cause costly down time of the entire computer system. These requirements for high speed rapid acceleration and deceleration, close tolerances on skewing, entry and exit of the pins, an accuracy of movement with respect to the operating member, such as the printer head, are not compatible with each other and have resulted in the use of complex and costly feed mechanisms. Characteristic of these feed mechanisms is the so called "tractor" which employs a chain or belt which is carried by a pair of sprocket gears, each link of the chain or portion of the belt carrying a sprocket pin which extends from the chain or belt. The pins enter the perforations in the document as they pass from curved paths around the sprockets into a straight path and are stripped from the documents as they leave the curved path when drawn around a second sprocket. Close tolerances are required between the pin location and the sprockets or else pairs of these tractors along opposite marginal edges of the document will not be in synchronism and will cause the entire document to skew, drag, bind, or actually tear in the mechanism. Thus, complex phasing adjustments at the sprocket shafts are required and must be maintained by regular adjustments during operation. Such adjustments are oftentimes incompatible with clean entry and stripping of the pins which cause driving forces to be applied to the document perforations in other than the linear path, thus tearing and damaging the document.

An improved feed mechanism which overcomes the aforementioned difficulties and disadvantages is disclosed in U.S. Pat. No. 3,825,162. The patent discloses a feed mechanism utilizing a strip of flexible material which is formed into an endless belt and presents a feeding surface facing outwardly and a surface opposite to the feeding surface which faces the area enclosed by the belt. Drive elements project from the feeding surface of the belt and may be in the form of pins which are spaced equidistant from each other; the increments between the pins being equal to the increments between the perforations of the document which is adapted to be driven by the mechanism. The drive elements may also have portions which project from the opposite or inner surface of the belt and which may be integral with the portions of the element which project from the feeding surface thereof. A frame supports the belt along the opposite or inner surface thereof and provides a bed along a linear path which may be disposed adjacent to the document to be fed. Driving means which may be disposed in the frame are provided for driving the belt. These driving means may be sprockets, at least one of which is a drive sprocket, while the other is an idler sprocket. The sprockets may be formed with hemi-cylindrical slots which engage the potions of the drive elements projecting from the opposite surface of the belt. These portions may be hemi-cylindrical and function as rollers in that as the sprockets turn, the drive elements roll with respect to the hemi-cylindrical slots in the sprockets.

Although the feed mechanism described in the aforementioned patent, in addition to driving and aligning the document, provides tension to the document as it travels through to the printing area, additional means may be necessary for proper control of the tension.

A typical prior art device for providing the additional tensioning means is shown in U.S. Pat. No. 3,746,142. As described in this patent, a paper tension mechanism for a line printer having an output tractor drive with a tension mechanism being utilized in lieu of an input tractor drive is provided. A cross shaft has pinwheels secured near each end thereof to engage with perforated paper, and one end of the shaft carries a slip bearing and a torsion collar with a torsion spring therebetween, the spring being in contact with the bearing and the collar, and wherein the slip bearing is pinched between a fixed block and a spring loaded block. Rotation of the cross shaft winds the torsion spring until the force is sufficient to rotate the slip bearing. The "drag" provided by the bearing applies tension to the paper in the area between the output tractors and the pinwheels, and when paper movement is stopped, as during the printing operation, the torsion spring tends to unwind and thereby holds the paper in tension. Adjustment means is also provided for the slip bearing by either increasing or decreasing the amount of pinch of the split block on the bearing, which, in turn, affects the tension in the paper. Although it is not clear when this adjustment step occurs, it appears that it is accomplished only when the paper is at rest, i.e., a static adjustment can only be performed which reduces the printing rate. Further, the relationship between the increase/decrease of paper tension versus the rotation of the adjustment means is clearly not linear which may impact the accuracy of the adjustment. Further, the use of spring force to adjust tension has several disadvantages including unpredictable friction and paper thickness, each a major problem in itself.

SUMMARY OF THE PRESENT INVENTION

The present invention provides apparatus used in conjunction with a document, or paper, feed mechanism for allowing the dynamic adjustment of the feed mechanism while document feed is occurring, thus dynamically adjusting document tension. The apparatus has a linear adjustment capability over its total range. In particular, adjusting levers are attached to the feed mechanism support shaft, pinions being attached to each end of the shaft. The pinion teeth mesh with the teeth of racks attached to each side plate of the feed mechanism. As the adjusting levers are moved, the support shaft and pinions rotate. The rotation of the pinion meshing with the rack causes the support shaft (and feed mechanism) to move, changing the distance between the feed mechanism and the printer platen. This distance, and document tension, vary linearly with the angular position of the levers for increased ease of adjustment. The document tension can be adjusted while the feed mechanism is operative thereby increasing effective printing rates.

It is an object of the present invention to provide apparatus associated with a printer document feed mechanism which allows the document tension to be adjusted while the printer and document feed mechanism are operative.

It is a further object of the present invention to provide apparatus associated with a printer document feed mechanism which allows the document tension to be adjusted while the printer and document feed mechanism are operative, the apparatus including an adjustable member whereby the document tension varies linearly with the angular position of the member.

BRIEF DESCRIPTION OF THE DRAWINGS

For a better understanding of the invention, as well as other objects and further features thereof, reference is made to the following description which is to be read in conjunction with the accompanying drawing wherein.

DESCRIPTION OF THE PREFERRED EMBODIMENT

Figure 1:
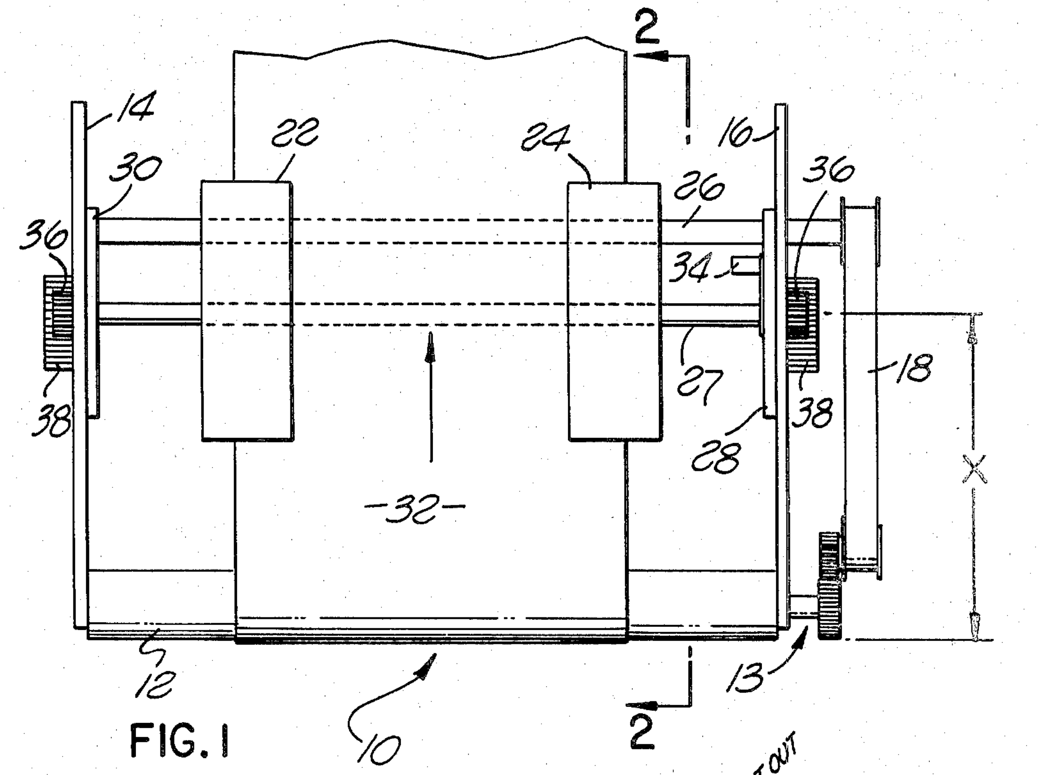
FIG. 1 shows a top plan view of a feed mechanism utilizing the tension adjusting apparatus of the present invention.
Figure 2:
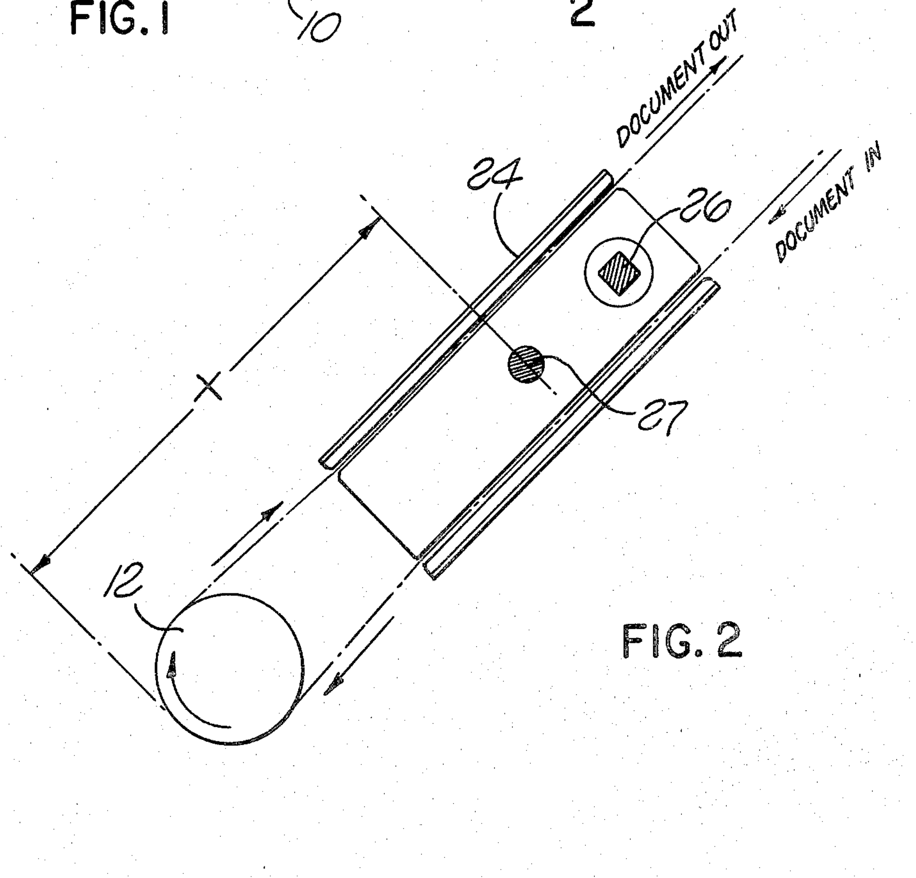
FIG. 2 is a side elevational view of the feed mechanism shown in FIG. 1 along line 2—2.

FIGS. 1 and 2 show, in schematic form, the principles of the present invention. The present invention can be adapted for use in many prior art printers, such as the Sprint 7 series of printers manufactured by Qume Corporation, San Jose, Calif. Feed mechanism 10 comprises (printer platen 12, drive gear 13 are part of the printer) side plates 14 and 16, drive belt 18 and tractor mechanisms 22 and 24, similar to those disclosed in U.S. Pat. No. 3,825,162. A drive shaft 26, driven by gear 13 and belt 18, extends through side plate 16, through a tension plate 28, tractor mechanisms 22 and 24 and is secured to end plate 14 via a second tension plate 30. A support shaft 27 extends through side plate 16, through tension plate 28, tractor mechanisms 22 and 24, tension plate 30 and side plate 14. Tractor mechanisms 22 and 24 are utilized to drive document 32 to platen 12 for printing. In accordance with the teachings of the present invention, adjustment lever 34, pinions 36 and racks 38 are incorporated in the document feed mechanism to allow the document tension to be adjusted linearly and dynamically when the printer is in the operative mode and document feed is proceeding. In operation, document 32 enters from the rear of feed mechanism 10 and engages drive pins (not shown) on back side of tractor mechanisms 22 and 24. The document 32 then feeds around the platen 12 and up the front of the tractor mechanisms 22 and 24 where it again engages drive pins.

Document tension is set by adjusting the "X" dimension. By increasing the "X" dimension in relation to the holes in document 32, the tension on the document can be increased since document 32 is wrapped around platen 12 and is pulled on both sides by tractor mechanisms 22 and 24. Similarly, decreasing "X" will decrease document tension. This method of adjusting document tension and the apparatus used to achieve it are the unique features of this invention.

Adjusting levers 34 are attached to the support shaft 27 and allow the operator to rotate shaft 27. Pinions 36 are attached to each end of the support shaft 27, the teeth of the pinions meshing with the teeth of racks 38 attached to each side plate 14 and 16. As the adjusting levers 34 are moved, the support shaft 27 and pinions 36 rotate. The rotation of the pinions 36 meshing with the racks 38 causes the support shaft 27 (and tractor mechanisms) to move linearly in the "X" direction, changing the "X" dimension. The "X" dimension and document tension vary linearly with the angular position of the levers, thus enabling the document tension to be adjusted accurately and easily by the printer operator.

Since this adjustment has no effect on the operation of the document drive other than document tension, the adjustment can be made while the feed mechanism is in use, thus providing for dynamic adjustment of document tension and corresponding increases in printing rates in contradistinction to the static adjustment requirements of prior art devices. It should be noted that the dynamic tension adjustment feature of the present invention is unique in itself and can be accomplished whether or not tension is adjusted in a linear manner. For example, racks 38, which provide the linearity feature, could be replaced with eccentrics. For this case, the tension adjustment can be accomplished dynamically although the tension would be adjusted as a cosine function of lever movement.

Figure 3:
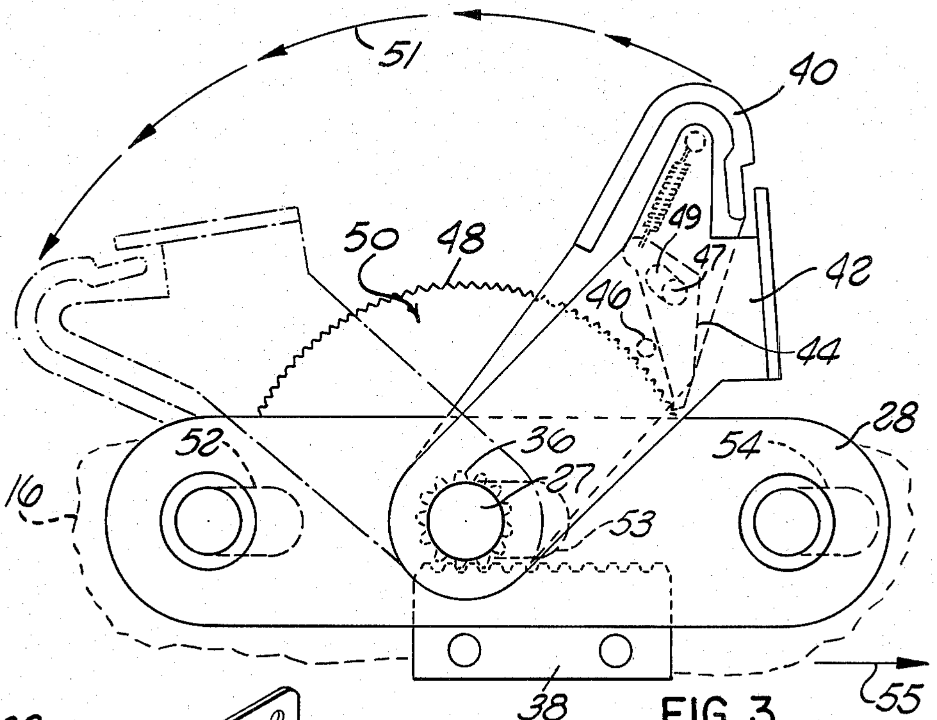
FIG. 3 shows the details of the apparatus utilized to adjust document tension in accordance with the teachings of the present invention.

Referring to FIG. 3, the details of the apparatus utilized to adjust document tension is illustrated (the apparatus is shown rotated 45° for purposes of illustration). The adjusting lever 34 actually comprises two levers 40 and 42.

The lever 42 is attached directly to the support shaft 27 and is used to adjust the document tension. When the correct tension is set, pawl 44 prevents lever 42 from moving toward the platen 12 (direction of arrow 55), thus locking the tension adjustment. Lever 40 provides the operator with two ways to release the pawl 44. This may be done by squeezing the lever 40 and the lever 42 together, or by simply pulling the lever 40 forward. Either way causes a pin 46 in the lever 40 to cam the pawl 44 away from the teeth 48 of rachet 50, a pin 47 on lever 42 moving within slot 49 on lever 40 as the pawl 44 is released. Once the pawl 44 is disengaged, the operator is free to adjust the document tension.

The position of the levers 40 and 42 prior to the adjustment of document tension (initial, or minimum, tension position) is shown in solid lines; the position of levers 40 and 42 at maximum adjustment of tension is shown by dashed lines, arrow 51 indicating the direction of lever travel from the minimum to maximum tension positions. The tension plates 28 (and 30) with the gear pinion thereon, slides on the side plate 14 (and 16) of the feed mechanism as levers 40 and 42 are angularly displaced (pinion gear 36 shown at maximum adjustment of tension), gear rack 38 being affixed to the side plate 14 (and 16) as shown. It should be noted that other devices can be utilized to drive the tension plates in a linear manner as the levers 40 and 42 are moved. For example, a cable and pulley (opposite ends of the cable coupled to the tension plate, the cable wrapped around the pulley and the pulley being mounted to shaft 27) can be utilized in lieu of the rack and pinions shown.

Figure 4:
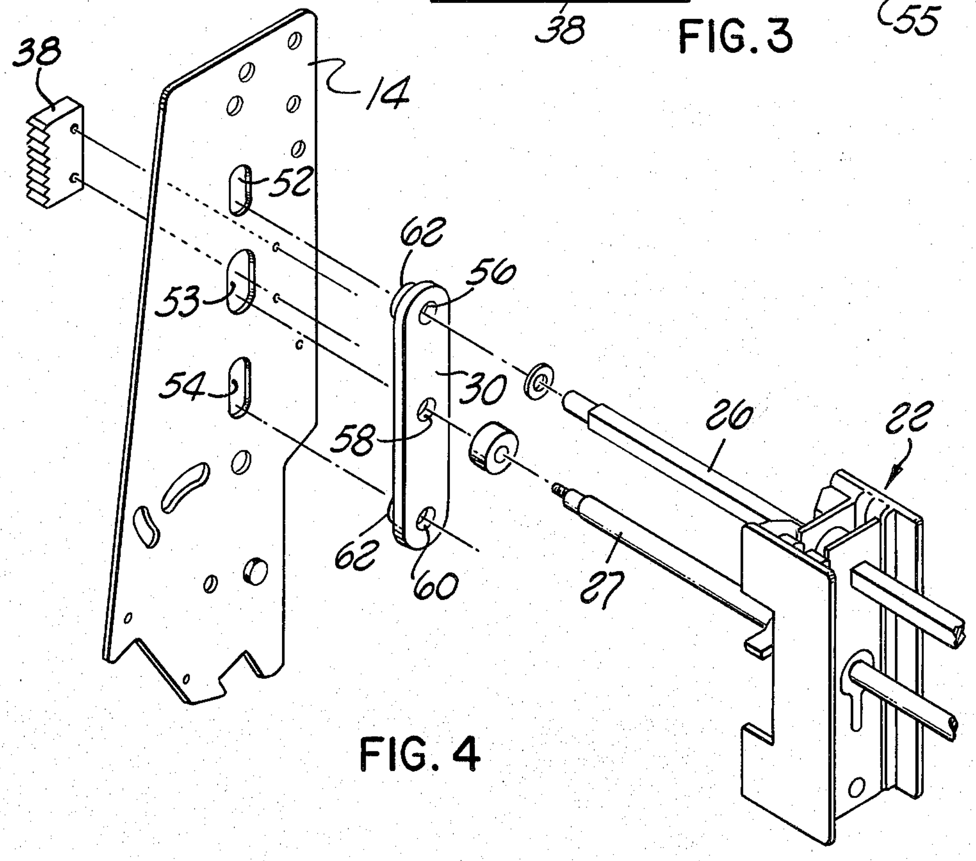
FIG. 4 is a partial exploded view of the left hand portion of the feed mechanism further illustrating the operation of the present invention.

FIG. 4 is an exploded view of a portion of the feed mechanism further illustrating the principles of the present invention. In particular, side plate 14 is shown having three apertures 52, 53 and 54 (side plate 16 has a similar arrangement) and tension plate 30 having corresponding, aligned apertures 56, 58 and 60. Drive shaft 26 and support shaft 27 extend through apertures 52, 56 and 53, 58, respectively, as shown. Cylindrical members 62 are provided on the tension plates 28 (and 30) which slide within apertures 52 and 54 formed on side plate 14 thus allowing tension plate 30 to slide as lever 34 is moved (typical range of movement is 0.25 inch) to provide for adjustment of the distance "X" as set forth hereinabove.

It should be noted that the present invention can be utilized with tractor mechanisms other than those shown in the figures. Further, the present invention is particularly useful for bi-directional printing because print registration is increased when approaching print lines in different directions.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or materials to the teachings of the invention without departing from its essential teachings.

What is claimed is:

1. A bi-directional paper feed for a printer comprising: first and second side plates fixed relative to each other in substantially parallel respective planes; a cylindrical platen rotatably mounted through said side plates and having an axis of rotation normal to said planes; a support shaft having an axis parallel to said platen axis and rotatably mounted through said side plates; first and second parallel tractor mechanisms mounted on said support shaft between said side plates to grip respective opposite sides of the paper as it enters and leaves said platen to feed and keep the said paper taut in a path to, around and from said platen; and means to adjust the position of said support shaft relative to said side plates in directions normal to said support shaft, said means including first and second pinion gears fixed relative to and respectively to first and second ends of said support shaft concentric therewith, said means including first and second racks fixed relative to and respectively to said first and second side plates, said first and second pinion gears being respectively in mesh with said first and second racks, counter-rotation and rotation of said support shaft causing adjustment thereof respectively toward and away from said platen by rotational engagement of said pinions with said racks; a lever arm fixedly secured to said support shaft and extending radially therefrom so as to cause said support shaft to rotate and said support shaft and said tractor mechanisms to be displaced away from said platen as said lever arm is pushed away from said platen; an arcuate ratchet gear centered about said support shaft and secured against rotation with respect to said side plates; a pawl pivotally mounted to said lever arm; pawl biasing means for urging said pawl into locking engagement with said ratchet gear so as to secure said support shaft against said counter-rotation; and pawl release means including a second lever arm rotatably mounted about said support shaft for releasing said pawl from engagement with said ratchet gear as said second lever arm is pulled towards said platen.

* * * * *